United States Patent
Argue et al.

(10) Patent No.: US 9,898,749 B2
(45) Date of Patent: Feb. 20, 2018

(54) METHOD AND SYSTEM FOR DETERMINING CONSUMER POSITIONS IN RETAILERS USING LOCATION MARKERS

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 599 days.

(21) Appl. No.: 13/754,746

(22) Filed: Jan. 30, 2013

(65) Prior Publication Data

US 2014/0214481 A1   Jul. 31, 2014

(51) Int. Cl.
 *G06Q 30/00* (2012.01)
 *G06Q 30/02* (2012.01)
(52) U.S. Cl.
 CPC ..... *G06Q 30/0201* (2013.01); *G06Q 30/0261* (2013.01)
(58) Field of Classification Search
 CPC .. G01C 21/206; G06Q 30/0261; G06Q 30/06; H04N 21/41407
 See application file for complete search history.

(56) References Cited

U.S. PATENT DOCUMENTS

| | | | |
|---|---|---|---|
| 6,064,749 A | 5/2000 | Hirota | |
| 6,123,259 A * | 9/2000 | Ogasawara | G06K 17/0022 235/380 |
| 6,954,735 B1 | 10/2005 | Kimmo Djupsjobacka | |
| 7,580,699 B1 | 8/2009 | Shaw | |
| 7,734,513 B2 | 6/2010 | Bonner | |
| 7,916,028 B2 | 3/2011 | Oberle | |
| 8,077,041 B2 | 12/2011 | Stern | |
| 8,180,396 B2 | 5/2012 | Athsani | |
| 8,239,277 B2 | 8/2012 | Lee | |
| 8,566,315 B1 * | 10/2013 | Davtchev | G06F 17/30817 707/736 |
| 2002/0010694 A1 * | 1/2002 | Navab et al. | 707/1 |
| 2002/0052709 A1 * | 5/2002 | Akatsuka et al. | 702/153 |

(Continued)

OTHER PUBLICATIONS

Love, Dylan. "The Real Meaning Behind 11 Car Company Logos." Business Insider. May 2011. retrieved from <http://www.businessinsider.com/car-logos-2011-5?op=1> on Aug. 6, 2015.*

(Continued)

*Primary Examiner* — Matthew Zimmerman (74) *Attorney, Agent, or Firm* — Bryan Cave LLP (57) ABSTRACT

A computer-implemented method is disclosed herein. The method includes the step of positioning at least one location marker at a position in a retail store. The method also includes the step of receiving, with a processing device of a position detection server, a video signal from an electronic device possessed by a consumer as the consumer shops in the retail store. At least one image frame of the video signal contains the at least one location marker. The method also includes the step of determining, with the processing device, a location of the consumer within the retail store in response to the receiving step.

18 Claims, 7 Drawing Sheets

(56) References Cited

U.S. PATENT DOCUMENTS

| | | | |
|---|---|---|---|
| 2005/0281410 A1* | 12/2005 | Grosvenor | H04H 60/47 381/61 |
| 2006/0037990 A1* | 2/2006 | Geise | 228/101 |
| 2013/0212094 A1* | 8/2013 | Naguib | G01C 21/206 707/730 |
| 2014/0289323 A1* | 9/2014 | Kutaragi et al. | 709/203 |

OTHER PUBLICATIONS

Jul. 2012—https://phys.org/news/2012-07-consu mer-product-giants-eye-trackers-size.html.*

* cited by examiner

METHOD AND SYSTEM FOR DETERMINING CONSUMER POSITIONS IN RETAILERS USING LOCATION MARKERS

BACKGROUND INFORMATION

Field of the Disclosure

The present invention relates generally to determining the position of a consumer within a retail store based on a video signal having images containing one or more location markers within the store.

Background

Manufacturers expend significant resources to better understand consumer purchasing habits in order to more effectively market products to consumers. The movement of consumers within a retail store can provide opportunities for marketing products to consumers. For example, if it were known that a consumer was moving toward a particular product, information and promotions associated with that product could be provided to the consumer. However, a retail store may extend across a large area and the retail store may offer thousands of different products for sale. It is not feasible to bombard a consumer regarding all of the available products, nor is it feasible to request that the consumer advise the retail store of the consumer's expected path of movement.

BRIEF SUMMARY OF THE INVENTION

Systems and methods are disclosed for determining the position of a consumer in a retail store using location markers.

In a first aspect of the present invention, a method for determining the position of a consumer in a retail store using location markers is disclosed. A location marker is positioned in a retail store. A processing device of a server receives a video signal from a consumer's electronic device as the consumer shops in the retail store. An image frame of the video signal contains the location marker. The processing device then determines a location of the consumer within the retail store.

In a second aspect of the present invention, a system for determining the position of a consumer in a retail store using location markers is disclosed. The system includes a position detection server having a processing device that can receive a video signal from a mobile device possessed by a consumer as the consumer shops in a retail store. At least one image frame of the video signal contains at least one location marker. The processing device includes a video processing module that receives the video signal and detects the at least one location marker in the video signal and also detects at least one distinguishing characteristic of the location marker The processing device also includes an identification module that identifies the at least one location marker from among a plurality of location markers in the retail store in response to the at least one distinguishing characteristic of the location marker. The processing device further includes a position module that determines a location within the retail store of the consumer based on the identity of the at least one location marker and based on the video signal received from the mobile device.

In a third aspect of the present invention, a method for determining the position of a consumer in a retail store using location markers is disclosed. Location markers are positioned at respective and spaced positions in a retail store. A processing device of a position detection server receives a video signal from a consumer's head mountable unit as the consumer shops in the retail store. At least one image frame of the video signal contains at least one of the location markers. The processing device identifies a location marker in the video signal from among the location markers within the retail store. The processing device then determines a location of the consumer within the retail store.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Embodiments of the present disclosure can assist in determining the location of a consumer in a retail store. When the location of the consumer has been determined, information related to products that are proximate to the consumer can be transmitted in a way that can be presented to the consumer. A position detection system according to some embodiments of the disclosure can include a position detection server that receives a video signal from an electronic device possessed by a consumer, such as an augmented reality device. The augmented reality device can be a head mountable unit worn by the consumer. This video signal can include at least one image frame in which one or more location markers are visible. A location marker includes a structure bearing or displaying at least one color. The color can include any color that is resolvable by a camera and the shape can be any shape that allows it to be identified by the position detection system. Geometric shapes such as circles and polygons can be used in some embodiments of the present disclosure. Other shapes can also be used, such as by way of example and not limitation a plus sign, a heart, a crescent, a straight or curved arrow, a "no" symbol (a loop with a diagonal line across), musical notes, a check mark, a shamrock, or any other shape.

A location marker can include more than one colored shape structure in a repeating or non-repeating pattern. These colored shape structures can have the same color or be of different colors, thereby forming a color pattern. The structure bearing the colored shape can be larger than the colored shape or can be co-extensive with the colored shape. The structure bearing the colored shape can be substantially two-dimensional, such as thin layer of color supported on another structure, or having a macroscopically visible depth. In some embodiments of the present disclosure, a plurality of location markers can be positioned in spaced locations about a retail store.

The video signal approximates the view of the consumer. The position detection server can determine the direction in which the consumer is looking and the location of the consumer within the retail store based on the identity of the location marker in the video signal and the position of that location marker within the retail store.

In some embodiments of the present disclosure, a location marker can include a single colored shape structure or can include multiple colored shape structures positioned together as a group. A group of colored shape structures can be arranged in a pattern, such as a strip or an array. A pattern for a group of colored shape structures can be selected based on numerous considerations, such as the color of the shape, shape difference, and/or dimensional scale of the shape. The pattern of the group of colored shape structures can be detected by the position detection server. The position detection server can identify a location marker from other location markers in the retail store in response to the pattern of colored shape structures that are detected in a video signal. Furthermore, in the case of a strip-type location marker, the position detection server can also determine the position within the length of the strip-type location marker by identifying the number of colored shape structures visible in the video signal.

Figure 1:
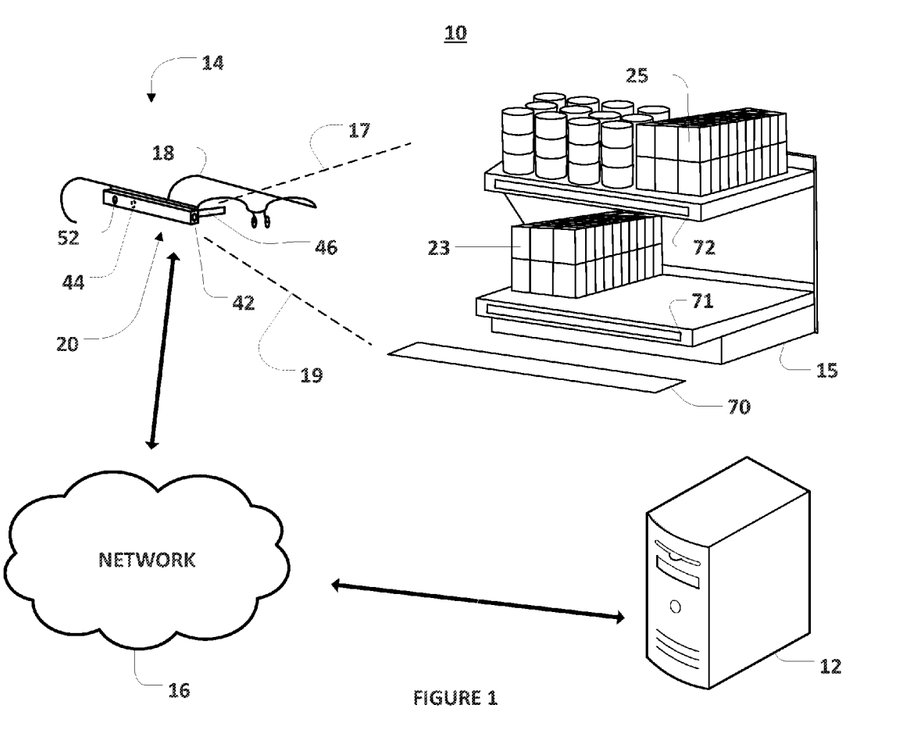
FIG. 1 is an example schematic illustrating a system according to some embodiments of the present disclosure.

FIG. 1 is a schematic illustrating a position detection system 10 according to some embodiments of the present disclosure. The position detection system 10 can implement a computer-implemented method that includes the step of receiving, with a position detection server 12, video from an augmented reality device worn by a consumer as the consumer is traversing through a retail store. The video can be received as a video signal from an augmented reality device such as a head mountable unit 14. The head mountable unit 14 can be worn by a consumer while shopping within a retail store. In the illustrated embodiment of FIG. 1, the exemplary head mountable unit 14 includes a frame 18 and a communications unit 20 supported on the frame 18.

A video signal can be transmitted from the head mountable unit 14 in which a portion of store shelving 15 is in the field of view of a camera 42 of the head mountable unit 14. A location marker 70 can be adhered to the floor while location markers 71 and 72 can be adhered to the front of store shelving 15. It is noted that embodiments of the present disclosure can be practiced in retail stores not using shelving and in retail stores partially using shelving.

The field of view of a camera 42 is illustrated schematically by dashed lines 17 and 19. The dashed lines 17 and 19 represent edges of the field of view of the camera 42. One or more products, such as products 23 and 25, can be disposed on the shelving 15 within the field of view of the camera 42.

The one or more signals transmitted by the head mountable unit 14 and received by the position detection server 12 can be transmitted through a network 16. As used herein, the term "network" can include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

Figure 2:
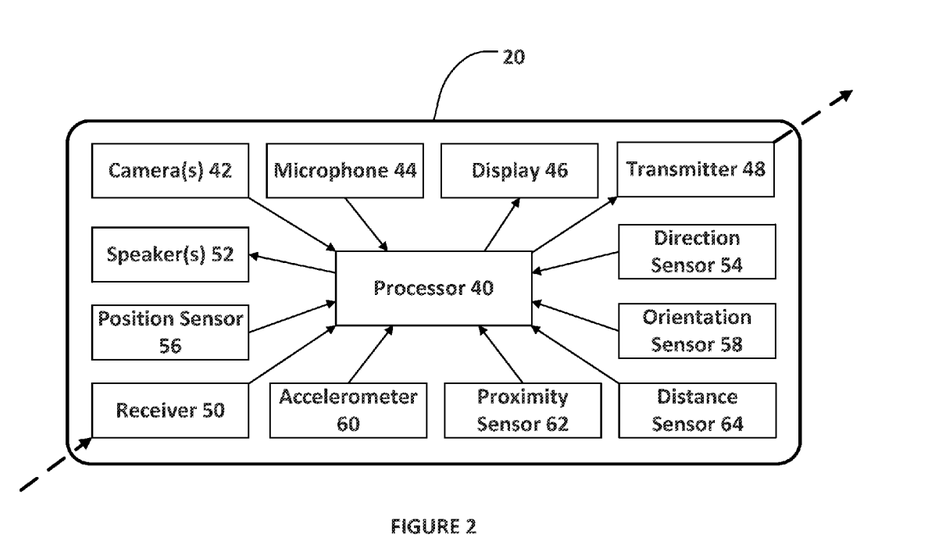
FIG. 2 is an example block diagram illustrating an augmented reality device unit that can be applied in some embodiments of the present disclosure.

FIG. 2 is a block diagram illustrating exemplary components of the communications unit 20. The communications unit 20 can include a processor 40, one or more cameras 42, a microphone 44, a display 46, a transmitter 48, a receiver 50, one or more speakers 52, a direction sensor 54, a position sensor 56, an orientation sensor 58, an accelerometer 60, a proximity sensor 62, and a distance sensor 64.

The processor 40 can be operable to receive signals generated by the other components of the communications unit 20. The processor 40 can also be operable to control the other components of the communications unit 20. The processor 40 can also be operable to process signals received by the head mount unit 14. While one processor 40 is illustrated, it should be appreciated that the term "processor" can include two or more processors that operate in an individual or distributed manner.

The head mount unit 14 can include one or more cameras 42. Each camera 42 can be configured to generate a video signal. One of the cameras 42 can be oriented to generate a video signal that approximates the field of view of the consumer wearing the head mountable unit 14. Each camera 42 can be operable to capture single images and/or video and to generate a video signal based thereon. The video signal may be representative of the field of view of the consumer wearing the head mountable unit 14.

In some embodiments of the disclosure, the head mountable unit 14 can include a plurality of forward-facing cameras 42. The cameras 42 can define a stereo camera with two or more lenses, each with a separate image sensor. This arrangement allows the cameras 42 to simulate human binocular vision and thus capture three-dimensional images. This process is known as stereo photography. The cameras 42 can also be configured to execute computer stereo vision in which three-dimensional information is extracted from digital images. In such embodiments, the orientation of the cameras 42 can be known and the respective video signals can be processed to triangulate an object such as location marker 72 with both video signals. This processing can be applied to determine the distance that the consumer is spaced from location marker 72. Determining the distance that the consumer is spaced from location marker 72 can be executed by the processor 40 or by the position detection server 12 using known distance calculation techniques.

Processing of the one or more, forward-facing video signals can also be applied to determine the identity of location marker 72 relative to other location markers in the retail store. The processor 40 can modify the video signals to limit the transmission of data back to the position detection server 12. For example, the video signal can be parsed and one or more image files can be transmitted to the position detection server 12 instead of a live video feed. Further, the video can be modified from color to black and white to further reduce transmission load and/or ease the burden of processing for either the processor 40 or the position detection server 12. Also, the video can be cropped to an area of interest to reduce the transmission of data to the position detection server 12. Video processing might drain batteries of the head mountable unit 14, so in some embodiments processing could be done periodically, such as every 15 seconds.

In some embodiments of the present disclosure, the cameras 42 can include one or more inwardly-facing cameras 42 directed toward the consumer's eyes. A video signal revealing the consumer's eyes can be processed using eye tracking techniques to determine the direction that the consumer is viewing. In one example, a video signal from an inwardly-facing camera 42 can be correlated with one or more forward-facing video signals to determine the location marker that the consumer is viewing.

The microphone 44 can be configured to generate an audio signal that corresponds to sound generated by and/or proximate to the consumer. The audio signal can be processed by the processor 40 or by the position detection server 12. For example, verbal signals can be processed by the position detection server 12 such as "this product appears interesting." Such audio signals can be correlated to a video recording.

The display 46 can be positioned within the consumer's field of view. Video content can be shown to the consumer with the display 46. The display 46 can be configured to display text, graphics, images, illustrations and any other video signals to the consumer. The display 46 can be transparent when not in use and partially transparent when in use to minimize the obstruction of the consumer's field of view through the display 46.

The transmitter 48 can be configured to transmit signals generated by the other components of the communications unit 20 from the head mountable unit 14. The processor 40 can direct signals generated by components of the communications unit 20 to the commerce sever 12 through the transmitter 48. The transmitter 48 can be an electrical communication element within the processor 40. In one example, the processor 40 is operable to direct the video and audio signals to the transmitter 48 and the transmitter 48 is operable to transmit the video signal and/or audio signal from the head mountable unit 14, such as to the position detection server 12 through the network 16.

The receiver 50 can be configured to receive signals and direct signals that are received to the processor 40 for further processing. The receiver 50 can be operable to receive transmissions from the network 16 and then communicate the transmissions to the processor 40. The receiver 50 can be an electrical communication element within the processor 40. In some embodiments of the present disclosure, the receiver 50 and the transmitter 48 can be an integral unit.

The transmitter 48 and receiver 50 can communicate over a Wi-Fi network, allowing the head mountable device 14 to exchange data wirelessly (using radio waves) over a computer network, including high-speed Internet connections. The transmitter 48 and receiver 50 can also apply Bluetooth® or Zigbee® standards for exchanging data over short distances by using short-range radio transmissions, and thus creating a personal area network (PAN). The transmitter 48 and receiver 50 can also apply 3G or 4G, which is defined by the International Mobile Telecommunications-2000 (IMT-2000) specifications promulgated by the International Telecommunication Union. The transmitter 48 and the receiver 50 can also apply a combination of wireless connections using differing technologies simultaneously.

The head mountable unit 14 can include one or more speakers 52. Each speaker 52 can be configured to emit sounds, messages, information, and any other audio signal to the consumer. The speaker 52 can be positioned within the consumer's range of hearing. Audio content transmitted by the position detection server 12 can be played for the consumer through the speaker 52. The receiver 50 can receive the audio signal from the position detection server 12 and direct the audio signal to the processor 40. The processor 40 can then control the speaker 52 to emit the audio content.

The direction sensor 54 can be configured to generate a direction signal that is indicative of the direction that the consumer is looking. The direction signal can be processed by the processor 40 or by the position detection server 12. For example, the direction sensor 54 can electrically communicate the direction signal containing direction data to the processor 40 and the processor 40 can control the transmitter 48 to transmit the direction signal to the position detection server 12 through the network 16. By way of example and not limitation, the direction signal can be useful in determining the identity of a location marker 72 in the video signal, as well as the location of the consumer within the retail store.

The direction sensor 54 can include a compass or another structure for deriving direction data. For example, the direction sensor 54 can include one or more Hall effect sensors. A Hall effect sensor is a transducer that varies its output voltage in response to a magnetic field. For example, the sensor operates as an analog transducer, directly returning a voltage. With a known magnetic field, its distance from the Hall plate can be determined. Using a group of sensors disposing about a periphery of a rotatable magnetic needle, the relative position of one end of the needle about the periphery can be deduced. It is noted that Hall effect sensors can be applied in other sensors of the head mountable unit 14.

The position sensor 56 can be configured to generate a position signal indicative of the position of the consumer within the retail store. The position sensor 56 can be configured to detect an absolute or relative position of the consumer wearing the head mountable unit 14. The position sensor 56 can electrically communicate a position signal containing position data to the processor 40 and the processor 40 can control the transmitter 48 to transmit the position signal to the position detection server 12 through the network 16. This position signal can, in combination with the present disclosure, result in a more accurate determination of the consumer's location within the store.

Identifying the position of the consumer can be accomplished by radio, ultrasound or ultrasonic, infrared, or any combination thereof. The position sensor 56 can be a component of a real-time locating system (RTLS), which is used to identify the location of objects and people in real time within a building such as a retail store. The position sensor 56 can include a tag that communicates with fixed reference points in the retail store. The fixed reference points can receive wireless signals from the position sensor 56. The position signal can be processed to assist in identifying one or more location markers 72 that are proximate to the consumer and are visible in the video signal.

The orientation sensor 58 can be configured to generate an orientation signal indicative of the orientation of the consumer's head, such as the extent to which the consumer is looking downward, upward, or parallel to the ground. A gyroscope can be a component of the orientation sensor 58. The orientation sensor 58 can generate the orientation signal in response to the orientation that is detected and communicate the orientation signal to the processor 40. The orientation of the consumer's head can indicate whether the consumer is viewing a lower shelf, an upper shelf, or a middle shelf.

The accelerometer 60 can be configured to generate an acceleration signal indicative of the motion of the consumer. The acceleration signal can be processed to assist in determining if the consumer has slowed or stopped, tending to indicate that the consumer is evaluating one or more products for purchase. The accelerometer 60 can be a sensor that is operable to detect the motion of the consumer wearing the head mountable unit 14. The accelerometer 60 can generate a signal based on the movement that is detected and communicate the signal to the processor 40. The motion that is detected can be the acceleration of the consumer and the processor 40 can derive the velocity of the consumer from the acceleration. Alternatively, the position detection server 12 can process the acceleration signal to derive the velocity and acceleration of the consumer in the retail store.

The accelerometer 60 and direction sensor 54 could be used to occasionally approximate the field of view perceived by the consumer between occurrences of real-time video monitoring with the cameras 42. Also, the accelerometer 60 and direction sensor 54 could be used to approximate the consumer's location in the retail store between occurrences of determining the location in real-time, the determination based on the detection and assessment of a location marker in a video signal.

The proximity sensor 62 can be operable to detect the presence of nearby objects without any physical contact. The proximity sensor 62 can apply an electromagnetic field or a beam of electromagnetic radiation such as infrared and assess changes in the field or in the return signal. Alternatively, the proximity sensor 62 can apply capacitive photoelectric principles or induction. The proximity sensor 62 can generate a proximity signal and communicate the proximity signal to the processor 40. The proximity sensor 62 can be useful in determining when a consumer has grasped and is inspecting a product.

The distance sensor 64 can be operable to detect a distance between an object and the head mountable unit 14. The distance sensor 64 can generate a distance signal and communicate the signal to the processor 40. The distance sensor 64 can apply a laser to determine distance. The direction of the laser can be aligned with the direction that the consumer is looking. The distance signal can be useful in determining the distance to an object such as a location marker in the video signal generated by one of the cameras 42, which can be useful in determining the consumer's location in the retail store.

Figure 3:
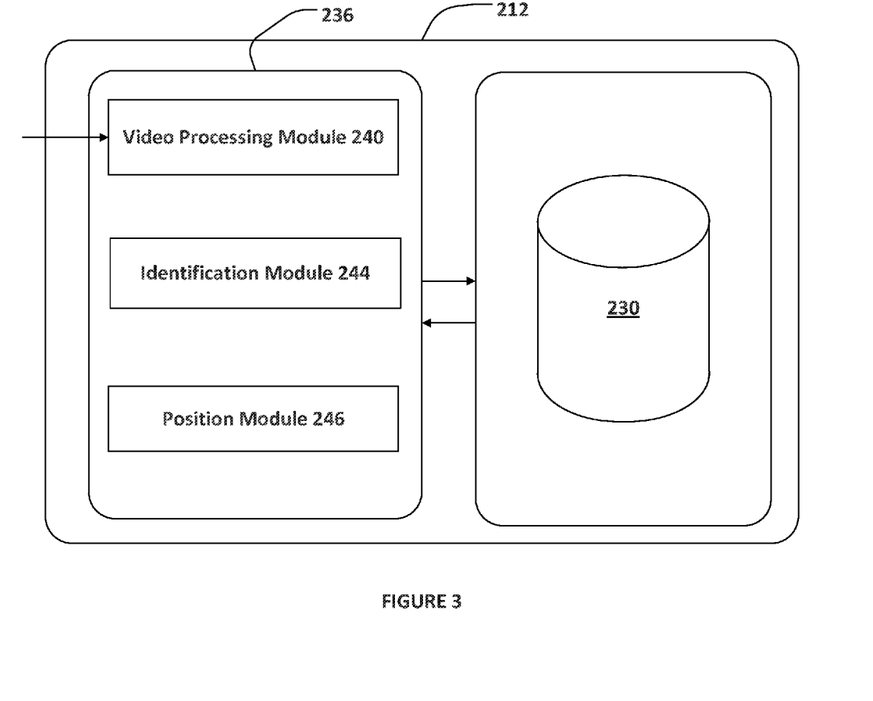
FIG. 3 is an example block diagram illustrating a position detection server that can be applied in some embodiments of the present disclosure.

FIG. 3 is a block diagram illustrating a position detection server 212 according to some embodiments of the present disclosure. In the illustrated embodiment, the position detection server 212 can include a location marker identification database 230. The position detection server 212 can also include a processing device 236 configured to include a video processing module 240, an identification module 244, and a position module 246.

Any combination of one or more computer-usable or computer-readable media may be utilized in various embodiments of the disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

The location marker identification database 230 can include distinguishing characteristics associated with each location marker positioned within the retail store. Distinguishing data can include the location within the retail store of the location marker, the color of the location marker, and physical configuration of patterns of colored shape structures associated with the location marker. The patterns of colored shape structures can be distinguished from one another by color patterns, shape patterns, and/or dimensional scale patterns. For example, a location marker can bear stripes of the same color or different colors. In another example, a location marker can have one or more red squares and one or more blue circles, wherein the radius of the circles is twice the width of the squares. The data in the location marker identification database 230 can be organized based on one or more tables that may utilize one or more algorithms and/or indexes.

The location marker identification database 230 can include in memory the position of each of the location markers positioned within the retail store. The positions of each of the plurality of location markers can be defined in relation to store features such as aisles or store departments. The positions of each of the plurality of location markers can also be defined in relation to a geometric grid covering the entire retail store in a fashion similar to a Cartesian coordinate system. The data associated with a location marker stored in the location marker identification database 230 can also include the direction or directions at which the location marker can primarily be viewed from.

The location marker identification database 230 can also include in memory the physical configuration of each location marker. For example, a location marker can include a single colored shape structure. Alternatively, a location marker in an embodiment of the present disclosure can include a plurality of colored shape structures arranged in a pattern. The pattern of colored shape structures can be detectable in the video signal and therefore the pattern can be stored in the location marker identification database 230.

The processing device 236 can communicate with the database 230 and receive one or more signals from the head mountable unit 14. The processing device 236 can include computer readable memory storing computer readable instructions and one or more processors executing the computer readable instructions.

The video processing module 240 can be operable to receive a video signal from the camera 42 of the head mountable unit 14. The video processing module 240 can also be operable to implement known video recognition/analysis techniques and algorithms to analyze the video signal received from the head mountable unit 14. For example, the video processing module 240 can analyze the video signal for the presence of a location marker. If a location marker is detected in the video signal, the video processing module 240 can attempt to determine the number and arrangement of colored shape structures within the location marker. The video processing module 240 can also detect the shape, relative dimensional scale, and colors of each colored shape structures associated with the location marker.

The identification module 244 can be configured to identify the location marker from among a plurality of location markers positioned in the retail store. Applying the data derived by the video processing module 240, the identification module 244 can access information stored in the location marker identification database 230 and identify the location marker from among a plurality of location markers positioned within the retail store.

The position module 246 can be operable to function cooperatively with the video processing module 240 and the identification module 244. The position module 246 receives the position of the location marker from the identification module 244 and can further analyze the video signal to determine the location of the consumer in the retail store. The position of the location marker within the retail store can be a point of reference. The position of the location marker within the video signal can indicate the position of the consumer relative to the location marker. In addition, the data in the video signal can indicate the direction that the consumer is looking.

The position module 246 can further be operable to receive, from the location marker identification database 230, the total number of colored shape structures within the location marker identified in the video signal and determine a position of the consumer along the length of the location marker by further analyzing the video signal to determine what percentage of colored shape structures can be identified. It is noted that an exemplary marker can be a strip affixed to the floor and extending some length along an aisle; thus, identifying the position of the consumer along such a location marker can be desirable.

Figure 4A:
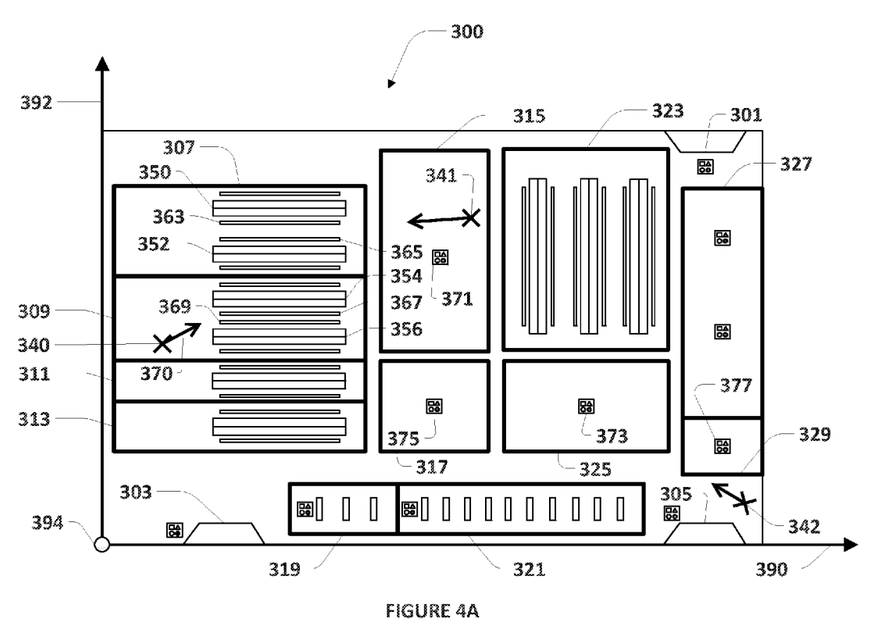
FIG. 4A is an example of a retail store layout map with location markers that can be applied in some embodiments of the present disclosure.
Figure 4B:
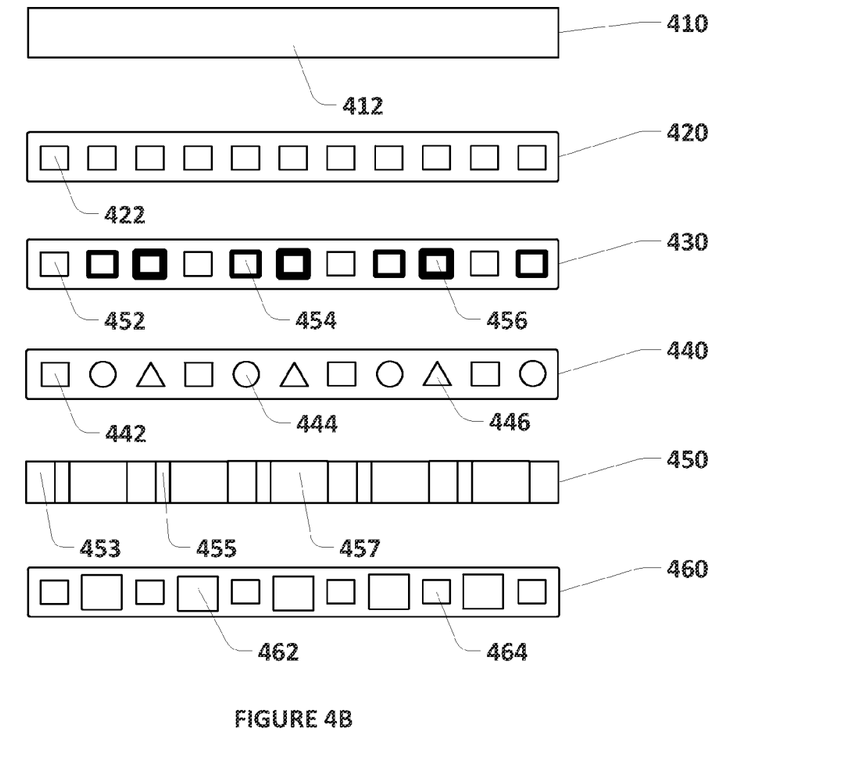
FIG. 4B is a set of different location marker examples configured as strip-type location markers that can be applied in some embodiments of the present disclosure.
Figure 4C:
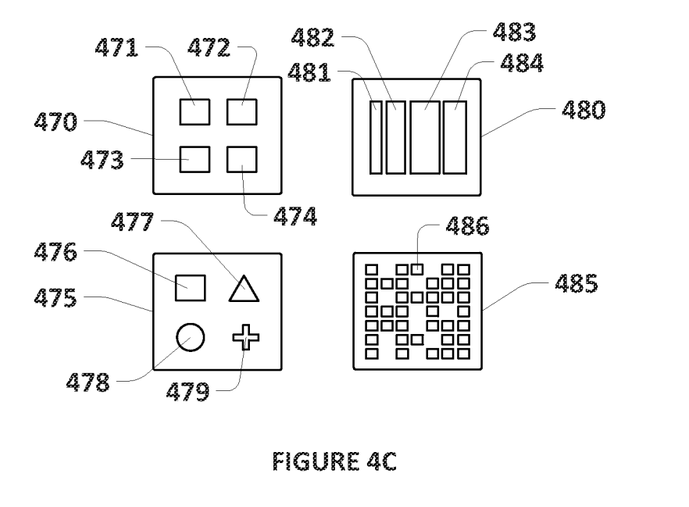
FIG. 4C is a set of different location marker examples configured as placard-type location markers that can be applied in some embodiments of the present disclosure.

FIGS. 4A-4C show various embodiments of the present disclosure. FIG. 4A illustrates a retail store map 300. The retail store can include entrances 301, 303, 305, and store departments 307, 309, 311, 313, 315, 317, 323, 325, 327, 329. The map 300 also displays a consumer service area 319, checkout counter area 321, and aisles 350, 352, 354, 356. It is noted that not all aisles are annotated to enhance the clarity of FIG. 4A but are illustrated similarly. Location markers 371, 373, 375, 377 can include one or more colored shape structures affixed together to form a placard-type location marker. It is noted that in FIG. 4A less than all of the placard-type location markers are annotated in order to enhance the clarity of FIG. 4A but are illustrated identically. Location markers 363, 365, 367, 369 can each include a plurality of colored shape structures together to form a strip-type location marker. It is noted that in FIG. 4A less than all of the strip-type location markers are annotated to enhance the clarity of FIG. 4A but are illustrated identically.

Consumers shopping in the retail store are referenced at 340, 341, and 342. A horizontal axis 390 is displayed extending along one edge of the map 300 and a vertical axis 392 is displayed extending along another edge of the map 300. An origin 394 of a Cartesian style coordinate system is defined at the intersection of the axes 390 and 392.

In some embodiments of the present disclosure, consumers 340, 341, and 342 each possess a head mountable unit 14 which can transmit a video signal to the position detection server 212. The position detection server 212 can receive the video signal from the head mountable unit 14 possessed by consumer 340. The video processing module 240 can detect strip-type location markers 367 and 369 in the video signal and determine distinguishing data associated with each location marker 367 and 369, such as color, color patterns, shape patters, and/or dimensional scale patterns. The identification module 244 can apply this data in accessing the location marker identification database 230. The identification module 244 can identify the location markers 367 and 369 from the data in the location marker identification database 230 and can thus identify the positions of the location markers 367 and 369 in the retail store.

The position module 246 can receive the position of the location markers 367 and 369 from the identification module 244 and can further analyze the video signal to determine the location of the consumer in the retail store. The positions of the location markers 367 and 369 within the retail store can indicate the position of the consumer 340 as being in an area proximate to the location markers 367 and 369. The positions and appearances of the location markers 367 and 369 within frames of the video signal can further define the position of the consumer 340. For example, since both location markers 367 and 369 are visible, the position module 246 can determine the direction that the consumer 340 is looking. This direction is referenced in FIG. 4A at 370. Further, the positions of the location markers 367 and 369 relative to each other can reveal the position of the consumer through triangulation and/or trigonometric calculations. The position module 246 can determine the position of the consumer and the direction that the consumer is looking with respect to the axes 390 and 392 or with respect to features in the retail store.

FIGS. 4B and 4C illustrate various configurations of location markers that can be applied in some embodiments of the present disclosure. FIG. 4B illustrates several examples of strip-type location markers 410, 420, 430, 440, 450, 460. Strip-type location marker 410 is comprised of a single colored shape structure 412. The strip 412 can bear any color. Colors that are relatively easier to detect in a video signal can be selected for the strip 412. It can be desirable to select the color for strip 412 to contrast with the color of the floor on which the strip 412 is mounted.

Strip-type location marker 420 is comprised of a series of identically-shaped and common colored shape structures 422. Each structure 422 can be separated from adjacent structures by a common distance.

Strip-type location marker 430 is comprised of a series of colored shape structures in a pattern. Colored shape structure 452 and all identically-illustrated structures associated with the location marker 430 can be a first color while colored shape structure 454 and all identically-illustrated structures associated with location marker 430 can be a second color. Finally, colored shape structure 456 and all identically-illustrated structures associated with the location marker 430 can be a third color. The three colors associated with the structures 452, 454, 456 can be recognizably different with respect to a video recognition system.

Strip-type location marker 440 is comprised of a series of colored shape structures in a pattern of different shapes. The colored shape structures 442, 444, 446 in location marker 440 can share the same color or can have different colors. Thus, the exemplary location marker 440 can have both a shape pattern and a color pattern.

Strip-type location marker 450 is another example of a strip-type location marker that can possess both a shape pattern and a color pattern. Colored shape structures 453, 455, and 457 are different colors and different shapes. Generally, the shape structures 453, 455, and 457 can cooperatively act in a means similar to a one dimensional bar code.

Strip-type location marker 460 bears a dimensional scale pattern and can simultaneously possess a variable color pattern. Colored shape structures 462 and 464 can be the same generally shape. The structures 462 and 464 can be differently-sized in that the ratio of any two dimensions in colored shape structure 462 is equal to that of the same ratio in colored shape structure 464. However, the dimensions can differ in scale thereby forming a dimensional scale pattern.

FIG. 4C illustrates several examples of placard-type location markers 470, 475, 480, 485 that can be applied in some embodiments of the present disclosure. Placard-type location marker 470 is comprised of colored shape structures 471, 472, 473, 474 that can have different colors.

Placard-type location marker 475 can include structures 476, 477, 478, 479 of different colors and different shapes. Placard-type location marker 480 contains four colored shape structures 481, 482, 483, 484 each having a different shape and the same color or different colors. The structures 481, 482, 483, 484 are separated from one another; a white space is defined between adjacent structures 481, 482, 483, 484. Placard-type location marker 485 can bear a two-dimensional dot matrix code. The identical dots in the matrix, one of which has been annotated as 486, form a grid of binary data that can be read by a camera. While traditionally the dots in the matrix are of the same color it would also recognized by one skilled in the art that they could have different colors thereby forming a color pattern.

In some embodiments, each of the placard style location markers 470, 475, 480, 485 can be disposed in separate planes around a single axis and positioned together such that the same placard style location marker could be visible from any direction.

It should be recognized that in some of the examples of FIG. 4B and FIG. 4C the colored shape structures are arranged in a pattern. In some of these examples the pattern could repeat and in other examples the pattern may not repeat. The term "pattern" should not be construed to require either a repeating pattern or a non-repeating pattern; both repeating patterns or a non-repeating patterns can be applied in embodiments of the present disclosure.

Figure 5:
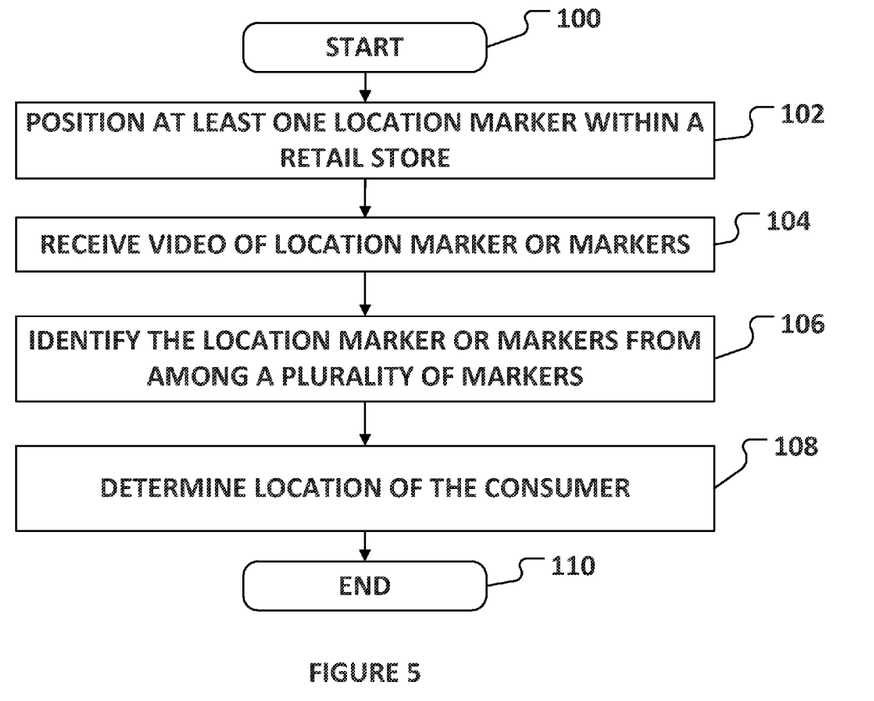
FIG. 5 is an example flow chart illustrating a method that can be carried out according to some embodiments of the present disclosure.

FIG. 5 is a flow chart illustrating a method that can be carried out in some embodiments of the present disclosure. The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The method as illustrated in FIG. 5 can be executed by a position detection server. The position detection server can be located at the retail store or can be remote from the retail store. The method starts at step 100. At step 102, at least one location marker can be positioned within a retail store. At step 104, the video signal containing an image of the at least one location marker can be received by the position detection server 212. At operation 106, the position detection server can identify the location marker from among a plurality of location markers positioned in the retail store. Operation 106 is optional, as embodiments of the present disclosure can be practiced with a single location marker. At step 108, the position detection server can determine a location of the consumer within the retail store based on the video signal, the position of the location markers that were identified in the video signal within the retail store, and, in the case of a strip style location marker, the percentage of visible colored shape structures. The exemplary method ends at step 110.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The above description of illustrated examples of the present disclosure, including what is described in the Abstract, are not intended to be exhaustive or to be a limitation to the precise forms disclosed. While specific embodiments of, and examples for, the present disclosure are described herein for illustrative purposes, various equivalent modifications are possible without departing from the broader spirit and scope of the present disclosure.

Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:

1. A method comprising:
providing a wireless access point located in a retail store;
positioning at least one location marker at a position in the retail store;
providing an application for use on an electronic device possessed by a consumer for connecting to a wireless network by way of the wireless access point and for recording a live video signal and a live audio signal, the live audio signal capturing at least a sound generated proximate to the consumer as the consumer shops in the retail store, the electronic device communicatively coupled to a position detection server;
modifying, with a processor of the electronic device, the live video signal at intervals to create a modified video signal;
transmitting, by the electronic device to the position detection server, the modified video signal and the live audio signal;
parsing, with a processing device of the position detection server, the modified video signal into a plurality of image frames;
selecting, with the processing device, at least one image frame from the plurality of image frames, the at least one image frame comprising the at least one location marker;
correlating, with the processing device, the live audio signal with the at least one image frame;
comparing, with the processing device, the at least one location marker with a plurality of location markers stored in a location marker database at the position detection server;
retrieving, with the processing device, location information associated with the at least one location marker from the location marker database;
receiving, by a real-time positioning system including a plurality of fixed reference points within the retail store, a plurality of wireless signals from a sensor associated with the electronic device;
determining, with the processing device, whether the consumer shopping within the retail store has slowed or stopped to evaluate at least one product in the retail store;
determining, with the processing device, a location of the consumer within the retail store based on the location information, a correlation of the live audio signal with the at least one image frame, and the plurality of wireless signals;
determining, with the processing device, that the at least one product is located within a fixed distance from the location of the consumer;
transmitting, from the processing device to the electronic device, information related to the at least one product, wherein the information comprises at least a promotion associated with the at least one product; and
displaying to the consumer the information related to the at least one product on a display of the electronic device.

2. The method of claim 1 wherein determining, with the processing device, the location of the consumer within the retail store based on the location information, the correlation of the live audio signal with the at least one image frame, and the plurality of wireless signals further comprises:
determining, with the processing device, a distance between the consumer and the position of the at least one location marker.

3. The method of claim 1 wherein:
determining, with the processing device, the location of the consumer within the retail store based on the location information, the correlation of the live audio signal with the at least one image frame, and the plurality of wireless signals further comprises:
determining, with the processing device, a direction within the retail store that the consumer is looking based on a live video signal, the modified video signal, or one or more of the plurality of image frames; and
the direction comprises at least a lower shelf, a middle shelf, or an upper shelf within the retail store.

4. The method of claim 1 wherein positioning the at least one location marker further comprises:
positioning the at least one location marker at the position in the retail store wherein the at least one location marker is a geometric shape bearing a single color.

5. The method of claim 1 wherein positioning the at least one location marker further comprises:
positioning the at least one location marker at the position in the retail store wherein the at least one location marker comprises a series of geometric shapes bearing a common color and arranged substantially along a line.

6. The method of claim 1 wherein positioning the at least one location marker further comprises:
positioning the at least one location marker at the position in the retail store wherein the at least one location marker comprises a series of colored, geometric shapes having different colors situated in a pattern in an array.

7. The method of claim 1 wherein positioning the at least one location marker further comprises:
positioning the at least one location marker at the position in the retail store wherein the at least one location marker comprises a series of colored shape structures each having a different color and shape with respect to one another and arranged in a color and shape pattern substantially in one of a line or an array.

8. The method of claim 1 wherein positioning the at least one location marker further comprises:
positioning the at least one location marker at the position in the retail store wherein the at least one location marker comprises the series of colored shape structures having different colors and dimensional scales situated in a color and dimensional scale pattern substantially along a line or in an array.

9. A system comprising:
a wireless access point located in a retail store;
an application for use on a mobile device possessed by a consumer for connecting to a wireless network by way of the wireless access point and recording a live video signal and a live audio signal, the live audio signal capturing at least a sound generated proximate to the consumer, as the consumer shops in the retail store, wherein a processor of the mobile device modifies the live video signal at intervals to create a modified video signal; and
a position detection server communicatively coupled to the application on the mobile device over the wireless network, the position detection server having a processing device operable to:

receive the modified video signal and the live audio signal from the application,
parse the modified video signal into a plurality of image frames,
select at least one image frame from the plurality of image frames, the at least one image frame containing at least one location marker, and
correlate the live audio signal with the at least one image frame;
wherein the processing device includes:
a video processing module operable to detect the at least one location marker in the at least one image frame,
an identification module operable to compare the at least one location marker with a plurality of location markers stored in a location marker identification database and to identify a location of the at least one location marker,
a real-time positioning system including a plurality of fixed reference points within the retail store for receiving a plurality of wireless signals from a sensor associated with the mobile device;
a position module operable to:
determine whether the consumer shopping within the retail store has slowed or stopped to evaluate at least one product in the retail store;
determine the location within the retail store of the consumer based on an identity of the at least one location marker, a correlation of the live audio signal with the at least one image frame, and the plurality of wireless signals, and
determine that the at least one product is located within a fixed distance from the location of the consumer, and
transmit information related to the at least one product to the application on the mobile device, wherein the information comprises at least a promotion associated with the at least one product.

10. The system of claim 9 wherein the position module is operable to determine a direction within the retail store that the consumer is looking, the direction comprising at least a lower shelf, a middle shelf, or an upper shelf.

11. The system of claim 9 wherein:
the position module is operable to determine a position along a length of the at least one location marker; and
the at least one location marker is a strip style location marker.

12. The system of claim 9 wherein:
the location marker identification database contains at least one distinguishing characteristic for each of the plurality of location markers; and
the at least one distinguishing characteristic is one of color, color pattern, shape pattern, dimensional scale pattern, or number of colored shape structures.

13. A method comprising:
providing a wireless access point located in a retail store;
positioning a plurality of location markers at respective and spaced positions in the retail store;
providing an application for use on an electronic device possessed by a consumer for connecting to a wireless network by way of the wireless access point and recording a live video signal and a live audio signal, the live audio signal capturing at least a sound generated proximate to the consumer, as the consumer shops in the retail store, wherein the electronic device is communicatively coupled to a position detection server;
modifying, with a processor of the electronic device, the live video signal at intervals to create a modified video signal;
transmitting, by the electronic device to the position detection server, the modified video signal and the live audio signal;
parsing, with a processing device of the position detection server, the modified video signal into a plurality of image frames;
selecting, with the processing device, at least one image frame from the plurality of image frames, the at least one image frame comprising at least one location marker of the plurality of location markers;
correlating, with the processing device, the live audio signal with the at least one image frame;
identifying, with the processing device, the at least one location marker from among the plurality of location markers within the retail store;
receiving, by a real-time positioning system including a plurality of fixed reference points within the retail store, a plurality of wireless signals from a sensor associated with the electronic device;
determining, with the processing device, whether the consumer has slowed or stopped to evaluate at least one product in the retail store;
determining, with the processing device, a location of the consumer within the retail store based on the at least one location marker, as identified, a correlation of the live audio signal with the at least one image frame, and the plurality of wireless signals;
determining, with the processing device, that the at least one product is located within a fixed distance from the location of the consumer;
transmitting, from the processing device to the electronic device, information related to the at least one product, wherein the information comprises at least a promotion associated with the at least one product; and
displaying to the consumer the information related to the at least one product on a display of the electronic device.

14. The method of claim 13 wherein positioning the plurality of location markers at the respective and spaced positions in the retail store further comprises:
positioning the plurality of location markers in the retail store that have different configurations with respect to one another, the different configurations comprising each location marker of the plurality of location markers being configured to include a different colored shape structure with respect to all other location markers of the plurality of location markers.

15. The method of claim 13 wherein positioning the plurality of location markers at the respective and spaced positions in the retail store further comprises:
positioning the plurality of location markers in the retail store that have different configurations with respect to one another, the different configurations comprising each location marker of the plurality of location markers is configured to include colored shape structures arranged in a different color pattern with respect to all other location markers of the plurality of location markers.

16. The method of claim 13 wherein positioning the plurality of location markers at the respective and spaced positions in the retail store further comprises:
positioning the plurality of location markers in the retail store that have different configurations with respect to one another, the different configurations comprising each location marker of the plurality of location markers is configured to include colored shape structures arranged in a different color pattern and a different shape pattern with respect to all other location markers of the plurality of location markers.

17. The method of claim 13 wherein positioning the plurality of location markers at the respective and spaced positions in the retail store further comprises:
   positioning the plurality of location markers in the retail store that have different configurations with respect to one another, the different configurations comprising each location marker of the plurality of location markers is configured to include colored shape structures arranged in a different color pattern and a different dimensional scale pattern with respect to all other location markers of the plurality of location markers.

18. The method of claim 13 wherein determining, with the processing device, the location of the consumer within the retail store based on the at least one location marker, as identified, the correlation of the live audio signal with the at least one image frame, and the plurality of wireless signals further comprises:
   determining, with the processing device, a direction within the retail store that the consumer is looking in response to selecting the at least one image frame and receiving, by the real-time positioning system including the plurality of fixed reference points within the retail store, the plurality of wireless signals from the sensor associated with the electronic device.

* * * * *